MAGNETIC STORAGE AND REPRODUCTION SYSTEM

Filed Oct. 2, 1953 2 Sheets-Sheet 1

INVENTOR
O. J. MURPHY
BY J. W. Schmied
ATTORNEY

MAGNETIC STORAGE AND REPRODUCTION SYSTEM

Filed Oct. 2, 1953 2 Sheets-Sheet 2

INVENTOR
O. J. MURPHY
BY J. W. Schmied
ATTORNEY

United States Patent Office 2,886,800

Patented May 12, 1959

2,886,800

MAGNETIC STORAGE AND REPRODUCTION SYSTEM

Orlando J. Murphy, New York, N.Y., assignor to Bell Telephone Laboratories, Incorporated, New York, N.Y., a corporation of New York Application October 2, 1953, Serial No. 383,778

16 Claims. (Cl. 340—174)

This invention relates to recording and pickup mechanisms and methods used in conjunction with magnetic storage apparatus. More specifically, this invention relates to improvements in call receivers and drum storage systems of the types disclosed in an application of McGuigan-Murphy-Newby, Serial No. 201,156, filed December 16, 1950, now Patent 2,700,148 issued January 18, 1955 which is incorporated herein by reference.

Magnetic storage systems usually comprise a moving magnetic surface and one or more magnetic heads having pole faces spaced from but in immediate proximity to said surface. Each head typically comprises a coil surrounding a laminated ferromagnetic core structure and is capable of use either as a reading or a writing instrumentality (read-write head).

In a writing operation, as described in the above-cited patent, a pulse of current is sent through the coil of the head, thereby magnetizing a discrete incremental area of surface (called a cell) beneath the head. On the other hand, when this or any other previously magnetized incremental area moves past the magnetic head there is a change of flux in the core of the head, which induces a voltage in the coil. This is referred to as a reading operation.

Writing pulses applied to the head are required to be of substantial amplitude, while reading pulses derived from the head are relatively of low amplitude. Amplifying means are therefore interposed between the head and the reading pulse output, and between the head and the writing pulse control source.

In the above-referred to patent the amplifying means used in the reading operation is subject to high amplitude pulses employed in the writing operation. This interaction of the writing means upon the reading means produces a situation where the decay of the heavy current used to write in a given cell tends to mask the relatively weak reading signal of the next succeeding cell. As a result, the prior art systems are restricted by a forced lower limit on the time separation of succeeding cells. The time separation has to be sufficient to allow decay of the writing transient before attempting to read the next cell.

This inherent limitation on cell spacing has spurred various attempts to expedite the decay of the flux in the head in order to decrease the time separation between succeeding cells. A decrease in time separation will also, in some cases, permit a decrease in spatial separation where the surface velocity of the magnetic medium is high. However, the prior art methods were directed toward reducing the transient decay time of the writing flux in the core of the head, while still permitting the remaining effects of the writing signal to manifest themselves upon the amplifying means used in the reading operation. Previous attempts, as a consequence, have resulted in mere alleviation of an undesirable situation.

It is therefore an object of the present invention to substantially isolate the action of the writing instrumentality from interference with the reading instrumentality although the two are electrically and magnetically interconnected.

Another object of this invention is to effectuate a clear reading of a given recorded cell prior to substantially full decay of the writing transient in the previous cell.

Another object of this invention is to reduce the spatial or time separation required between succeeding cells.

A further object of this invention is to allow an increase beyond the existing permissible velocity of the magnetic surface in magnetic recording or storage mechanisms.

The present invention accomplishes the foregoing and other objects by connecting the coil of the read-write head in one arm of a balanced bridge circuit. An opposite arm of the bridge has an impedance designed to simulate the inverse or dual of the impedance of the head coil at the essential frequencies. The remaining arms of the bridge, in the illustrative embodiment, are resistive. The reading amplifier input is connected to one set of conjugate diagonal terminals of the bridge and the writing amplifier output is connected to the other two conjugate diagonal bridge terminals. As a consequence, the writing signals are balanced out with respect to the reading signal input. Therefore, the high recording flux and transients incident thereto do not have to decay before the next cell can be read, permitting closer cell spacing.

As stated above, the impedance of the head is to be simulated at essential frequencies. Essential in this context means essential to the effective operation of the equipment. In general, these frequencies include current components varying at a number of frequencies including very high frequencies; consequently a further object is to provide for the balance over the necessary range of frequencies. During a reading operation, the principal energy components of these frequencies may lie in a range from a few tens of kilocycles to a few hundreds of kilocycles. In a writing operation, the principal energy components may lie in a range from a few tens of kilocycles to a few megacycles.

The foregoing objects and features of this invention may be more readily understood from the following specification and appended claims when read with reference to the attached drawings in which:

Fig. 3 shows the details of the bridge network employed to divorce the recording from the reading amplifier, and the method of connection to the amplifier used in the McGuigan et al. patent above referred to;

Figure 1:
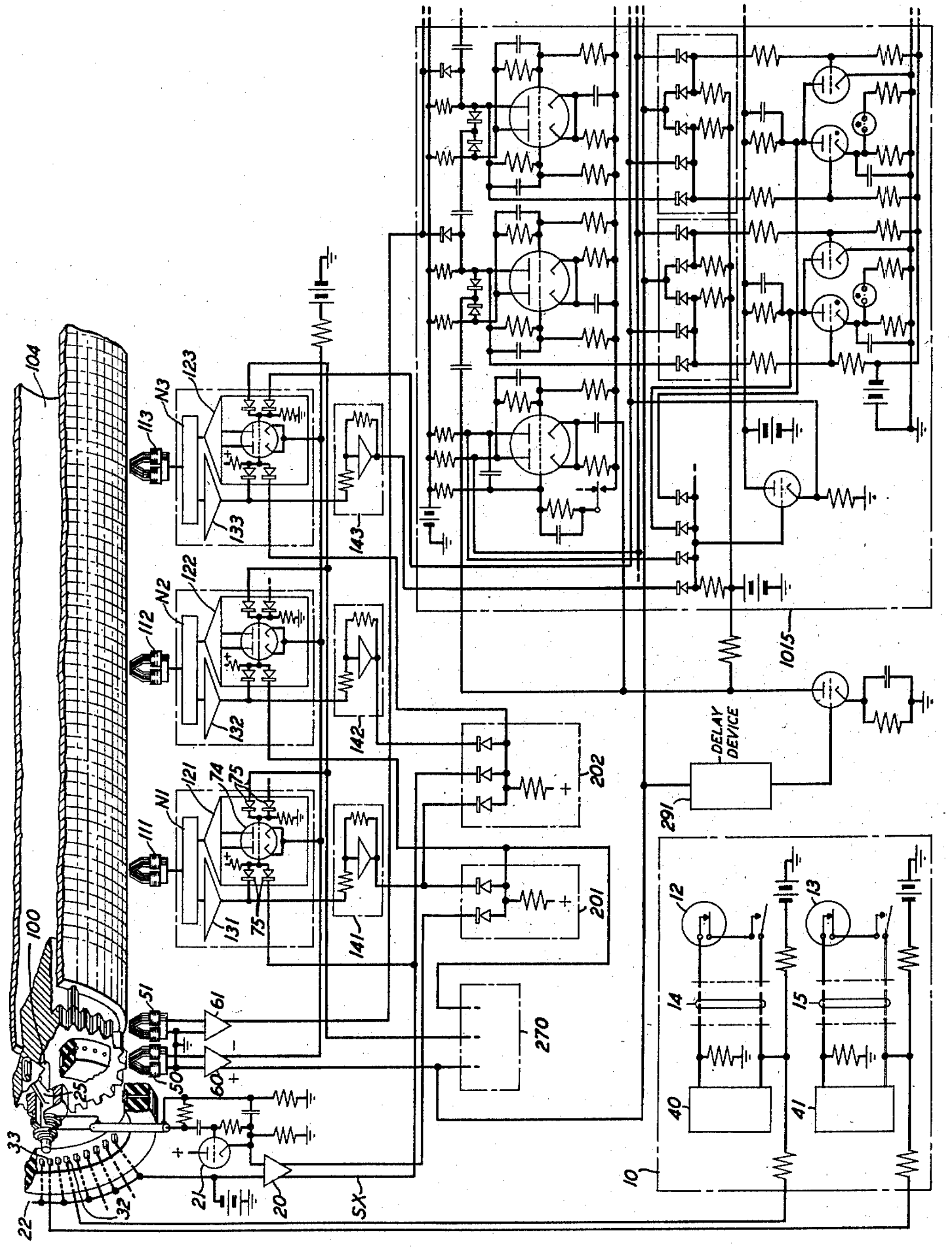
Fig. 1 shows an exemplary embodiment of a magnetic storage system suitable for use in combination with the present invention.

In Fig. 1 a signaling device 10 is shown which represents a plurality of calling lines such as 14, 15, etc. supplied by signal generators 12, 13, etc. for initiating signals in these lines. The lines 14, 15, etc. may also include terminal equipment such as 40 and 41 which, in the case of a telephone switching system, may comprise telephone and voice transmission equipment. Lines 14, 15, etc. are connected individually to segments 32, 33, etc. on the electrostatic scanner 22. The scanning arm 25 rotates past segments 32, 33, etc. sensing voltage changes on lines 14, 15, etc. The condition of the lines 14, 15, etc. represents the signals to be recorded on the drum 104. The scanner 22, its function and operation, are fully disclosed in the above-mentioned patent of McGuigan et al. and will not be treated further herein.

The voltage conditions induced upon the scanning arm 25 are amplified by amplifiers 21 and 20 to a level sufficient to actuate the recording equipment 121, 122, 123, etc. to be discussed herein.

The output of the scanning amplifier 20 is transmitted through the SX output lead to the recording amplifier 121 connected through network N1, discussed herein, to the combined recording and pickup coil 111.

The combined recording and pickup coil structure 111, is one of a plurality of such structures 112, 113, etc. mounted in close proximity to the magnetic surface of the drum 104. The recording and pickup coil 111 comprises a core of ferromagnetic material having pole tips and a coil surrounding said core.

Figure 5:
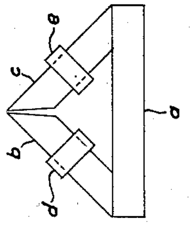
Fig. 5 shows elevations of the core of the read-write head.

In an exemplary embodiment, the core of the head consists of three stacks of laminations arranged to form a delta as shown in Fig. 5. Each lamination of 4 percent nickel and 79 percent molybdenum permalloy is substantially 1 mil or 0.00254 centimeter in thickness and 0.1 inch or 0.254 centimeter in width. The three stacks are composed of fifty laminations each. The lower stack of laminations *a* is 0.845 inch in length or 2.145 centimeter and the upper stacks *b* and *c* are each 0.575 inch or 1.46 centimeters. The distance between the pole tips at the nearest point is 0.002 inch or 0.00508 centimeter. Each upper stack *b* and *c* has a winding *d* and *e*, respectively, of thirty turns of No. 34 wire surrounding it. The head illustrated in this exemplary embodiment is referred to in the art as a delta head. A full description of this head may be found in the application of J. R. Anderson, Serial No. 145,027, filed February 18, 1950, now Patent No. 2,662,120, dated December 8, 1953. It is to be understood, however, that this type of head is merely illustrative of the many types of heads that may be utilized in the practice of the invention. In addition to the pickup and recording coils 111, 112, 113, etc., additional pickup coils such as 50 and 51 are provided for generating timing and synchronizing pulses. The outputs of coils 50 and 51 are amplified by their respective amplifiers 60 and 61. The function of coils 50 and 51 will be explained herein.

A recording amplifier is provided individually for each of the combined recording and pickup coils. For example, amplifier 121 is provided for coil 111, amplifier 122 for coil 112, etc. Under predetermined conditions, later described, the signal on output lead SX of the scanning amplifier 120 will actuate the recording amplifier 121, which in turn will send a pulse of current through network N1 into coil 111. This current produces a flux between the pole tips, causing a signal to be recorded in the area under the pole-pieces.

The signal to be recorded has thus been traced from its generation to its recordation on the surface of the drum 104.

In order to amplify the weak signals induced in the heads by the passage of previously recorded signals, reading amplifiers 131, 132, 133, etc. are provided individually for coils 111, 112, 113, etc.

Interposed between the coils of the head and the reading and recording amplifiers are networks N1, N2, N3, etc.; the interposition of these networks in the form of balanced bridge structures constitutes a specific improvement over the devices shown in the McGuigan et al. patent above referred to, as will be demonstrated herein.

It will be noted at this point that timing circuit 270, gate circuits 201 and 202, phase inverter stages 141, 142, 143, etc., delay device 291 and registering mechanism 1015 constitute part of the over-all embodiment but are not essential to the explanation of the invention and will not be discussed further herein. A comprehensive discussion of these elements is made in the above referred to patent of McGuigan et al.

Having thus generally described the operation of the entire embodiment, it remains to described in further detail the actions of the writing amplifier and reading amplifier and the method of and means for accomplishing their mutual isolation. Briefly tracing the action of the recording amplifier 121 in a writing operation, we have as follows: The operation of the writing amplifier 121 is controlled by its associated control circuit 74 and 75. The control circuit comprises a gate tube 74 and four diodes or rectifiers 75. For sufficient current to flow in either section of gate tube 74 it is necessary that positive voltage be applied to the grid of the respective section and a negative pulse be applied from the synchronizing amplifier 60 to the associated cathode circuit.

Thus as a high positive voltage is applied to both of the left-hand inputs and a negative pulse from the synchronizing amplifier 60 is supplied to the cathodes of the gate tube 74, writing current will flow in the left-hand section of gate tube 74 through writing amplifier 121 into network N1 and thereafter to coil 111. This current flow through coil 111 causes a signal to be recorded in the cell centered under the pole-pieces of the coil, or head 111, at the instant of the timing pulse from the synchronizing amplifier 60.

If a relatively high positive voltage is applied to the grid of the right-hand section of gate tube 74, current flows in the right-hand section upon the application of a negative timing pulse from amplifier 60 to the cathodes of gate tube 74. As a result, the writing amplifier 121 sends current through network N1 into coil 111. This current through coil 111 causes a flux between the pole-pieces which is in the opposite direction to the flux produced by current through the left-hand section, and is in such a direction that a signal opposite in character to the above-described signal is recorded in the magnetic material then under the pole-pieces of coil 111.

Figure 2:
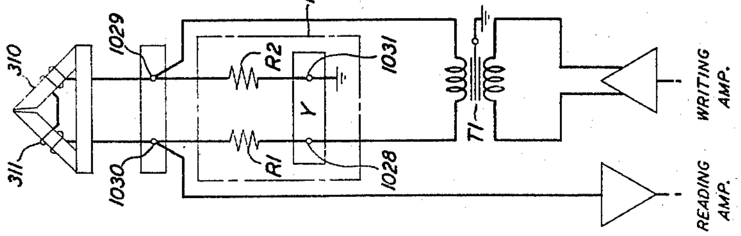
Fig. 2 shows a schematic circuit wherein a recording and reading amplifier are used in combination with a combined recording and pickup coil.

As shown in Fig. 2 a network N1, referred to but not described above, is interposed between the coil 311 and the reading and writing amplifiers. The network N1 is so arranged that it forms in conjunction with the head 310 a balanced bridge structure. In the embodiment shown, the head coil 311 constitutes one arm of the bridge, an opposite arm comprising a balancing circuit Y so designed that its admittance as a function of frequency has the same mathematical form as the impedance of coil 311. R1 and R2 are resistance elements constituting the other two arms of the bridge.

If we designate the complex impedance of the head coil 311 as Z, then for a balanced bridge arrangement we have:

$$R_1R_2=ZY \qquad (1)$$

Thus the magnitude of the complex impedance of Y must be such as to satisfy Equation 1. However, it is to be understood that though $R_1$ and $R_2$ are shown as resistances, other complex impedances may be used provided they satisfy Equation 1.

The writing amplifier is coupled to the bridge circuit through transformer T1 whose secondary leads are connected to terminals 1028 and 1029.

The reading signals appear across terminals 1030 and 1031 which latter is at ground potential. The reading amplifier input is connected to terminal 1030. Consequently the writing signal appears across terminals 1028 and 1029, two conjugate diagonal terminals of the bridge, and the reading signal appears across terminals 1030 and 1031, the other two conjugate diagonal bridge terminals. The isolation of the writing signal from the reading amplifier input is thereby achieved.

Figure 3:
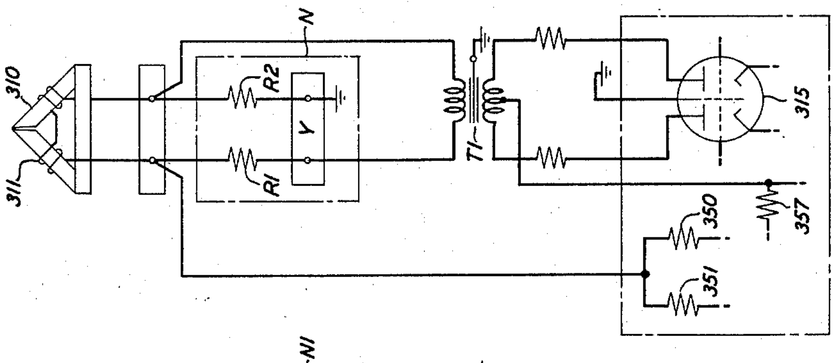

In other respects, with the exception of transformer T1, coupling the writing amplifier to the head coil 311, the operation of the reading and writing amplifiers remains unchanged and is fully disclosed in the McGuigan et al. patent referred to above. Fig. 3 illustrates the connections required to incorporate the present invention into the recording and pickup mechanism shown in the McGuigan et al. patent. The coupling transformer T1 is advantageous in that it may transform the writing amplifier output to a higher voltage in coupling it to the head coil 311. Transformer T1 is necessary for balanced transmission to the bridge, one end of the opposite diagonal of which is grounded.

It is to be understood that though in theory, for a balanced structure, no part of the writing voltage will appear across the reading amplifier, as a practical matter perfect balance is seldom achieved. This factor is not essential since for small departures from balance substantially only a minor part of the writing voltage appears across the reading amplifier input.

However, to further mitigate the small writing voltage that may appear across the reading amplifier the prior conventional methods for expediting the decay of the writing transient may be used in conjunction with the invention. These include, but are not limited to, transformer coupling of the writing amplifier as indicated above. The objects of the invention may be achieved with a wide range of amplifier circuits.

Figure 4A:
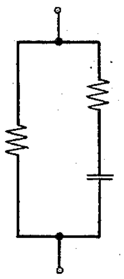
Figs. 4A, 4B, 4C and 4D show the details of circuits satisfactory for use as the balancing circuit Y indicated in Fig. 2.
Figure 4B:
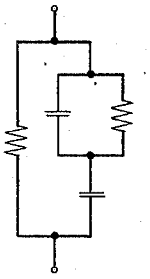
Figure 4C:
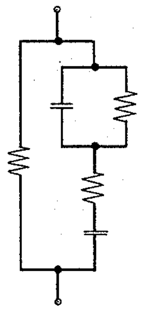
Figure 4D:
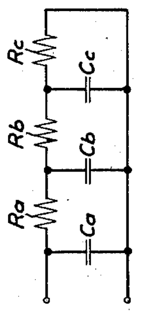

Figs. 4A, 4B and 4C illustrate various component arrangements that may be used in the balancing circuit Y which simulates the impedance of the head coil 311. They provide the possibility of successively better balance over the desired range of frequencies at the expense of more and more circuit elements. Fig. 4D shows a different form of network which may be made to give even better balance than that shown in Fig. 4C, since it contains one more circuit element. As shown for Fig. 4D, resistors R*a*, R*b* and R*c* are connected in parallel with condensers C*a*, C*b* and C*c*. In an illustrative exemplification of a circuit to balance the head illustrated in Fig. 5, the components would take the following values when the bridge resistors $R_1$ and $R_2$ are 10 and 1000 ohms respectively:

| | |
|---|---|
| R*a* | 15,000 ohms. |
| R*b* | 3,900 ohms. |
| R*c* | 8,000 ohms. |
| C*a* | 750 micromicrofarads. |
| C*b* | 230 micromicrofarads. |
| C*c* | 140 micromicrofarads. |

It is to be understood that the circuits and values shown are exemplary and will yield satisfactory results; other combinations possible will be apparent to those skilled in the art and will not depart from the scope of this invention. It is also to be understood that though a specific form of impedance bridge is shown in the embodiment, other types of bridges and other structures employing the bridge principle including but not limited to hybrid coils may be utilized.

It is further to be understood that though the embodiment in Fig. 1 illustrates the invention used in combination with a magnetic storage system employing the single pass method described in Patent 2,700,148 of January 18, 1955 to McGuigan-Murphy-Newby, the present invention is not restricted to said single pass method. The present invention may be utilized in combination with any magnetic storage technique in which it is desirable to disassociate the effects of the writing mechanism from manifestation upon the reading mechanism though the two are electrically and/or magnetically interconnected.

There are many variable factors which determine the scanning speed in cells per second, that is, the number of spots available for recording a signal or reading off of the magnetic sheet a signal already recorded. In typical operations the present invention may be operated in connection with a magnetic drum involving a speed of 3600 revolutions per minute and having 1000 cells in each zone. This gives a possible writing or recording speed or both of 60,000 cells per second. This speed is somewhat conventional according to current practice, it having been found possible by the use of the principles of the present invention to double this reading and writing speed. However, the invention is not to be taken as limited to any particular speed because it is useful at lower speed wherein the power employed for recording on the drum and the desired power taken off in a reading operation, or both, is increased. Furthermore, the applicability of the invention is not necessarily limited to a cylindrical drum because it could be applied to arrangements having any form of magnetic sheet moving in a reentrant path such, for example, as a belt having a magnetic surface operated over pulleys and having one portion suitably related to reading and writing heads. As stated above, the present invention is not restricted to the single pass method. To further illustrate this point the making of a record in one cell followed by a reading operation in the immediately following cell involves a condition wherein the stored energy from the recording operation may be sufficient to disturb the reading operation which immediately follows. Although the conditions are not so severe in such case as in the single pass case, nevertheless, the use of the present invention facilitates the design of circuits associated with the head suitable for the purpose.

What is claimed is:

1. In a signal storage device, a circuit arrangement comprising, means for recording magnetic conditions on a magnetic medium, means for reading previously recorded magnetic conditions on said medium, a common impedance device coupled to said recording and reading means, and means for isolating said recording means from said reading means comprising a substantially balanced electrical bridge having a plurality of terminals, said recording means being connected to one pair of said terminals and said reading means being connected to another pair of said terminals whereby signals from said recording means are prevented by said electrical bridge configuration from appearing with significant magnitude across said reading means.

2. In a signal storage device, a circuit arrangement comprising, means for recording magnetic conditions on a magnetic medium, means for reading previously recorded magnetic conditions on said medium; and means for isolating said recording means from said reading means comprising a substantially balanced electrical bridge, wherein said recording means and said reading means have a common impedance device in the form of a combined recording and reading head; and said isolating means includes said recording and reading head in combination with said balanced bridge.

3. In a signal storage device, a circuit arrangement comprising, means for recording magnetic conditions on a magnetic medium, means for reading previously recorded magnetic conditions on said medium; and means for isolating said recording means from said reading means comprising a substantially balanced electrical bridge, wherein said recording means and said reading means have a common impedance device in the form of a combined recording and reading head; and said isolating means comprises an inverse balancing impedance to balance the impedance of said recording and reading head, and two impedance elements to connect said balancing impedance to said common impedance.

4. In a storage device, a circuit arrangement comprising, means for recording magnetic conditions on a magnetic medium, means for reading previously recorded magnetic conditions on said medium; and means for isolating said recording means from said reading means comprising a substantially balanced electrical bridge, said recording means and said reading means having a common impedance device in the form of a combined recording and reading head; said isolating means comprising an inverse balancing impedance to balance the impedance of said recording and reading head, and two impedance elements to connect said balancing impedance to said common impedance, wherein said recording means and said reading means each includes an amplifying means; and said reading and recording amplifying means are connected to said isolating means and said combined recording and reading head.

5. A circuit arrangement for magnetically recording electrical signal conditions upon a magnetic medium and deriving electrical signals from conditions recorded upon said magnetic medium, comprising a recording-reading head having winding means, recording means including a current source connected to said winding means for energizing said winding means to produce a field to magnetically modify a portion of said medium; a receiving circuit electrically connected to said winding means and responsive to electric currents induced in said winding means by said magnetic medium; and an electrical network connected to form with said winding means a substantially balanced impedance bridge, said signal current source being connected to one set of conjugate diagonal bridge terminals and said receiving circuit being connected to the other set of conjugate diagonal terminals of said bridge.

6. A device in accordance with claim 5 wherein said bridge comprises said winding means as one arm of said bridge and balancing means simulating the inverse of the impedance of said winding means at the essential frequencies comprises the opposite arm of said bridge; and the two other arms comprise impedance elements whose complex impedances are such that their product is equal to the product of the complex impedances of said winding means and said balancing means.

7. A device in accordance with claim 6 wherein said balancing means comprises resistance and capacitance elements.

8. A device in accordance with claim 6 wherein said balancing means comprises resistance and capacitance elements in series combinations.

9. A device in accordance with claim 6 wherein said balancing means comprises resistance and capacitance elements in parallel combinations.

10. A device in accordance with claim 6 wherein said balancing means comprises resistance and capacitance elements in series-parallel combinations.

11. A circuit arrangement for magnetically recording electrical signal conditions upon a magnetic medium and deriving electrical signals from conditions recorded upon said magnetic medium, comprising a recording-reading head having winding means, recording means including a current source connected to said winding means for energizing said winding means to produce a field to magnetically modify a portion of said medium; a receiving circuit electrically connected to said winding means and responsive to electric currents induced in said winding means by said magnetic medium; and an electrical network connected to form with said winding means a substantially balanced impedance bridge, said signal current source being connected to one set of conjugate diagonal bridge terminals and said receiving circuit being connected to the other set of conjugate diagonal terminals of said bridge, said bridge comprising said winding means as one arm of said bridge and balancing means simulating the inverse of the impedance of said winding means at the essential frequencies comprising the opposite arm of said bridge; the two other arms of said bridge comprising impedance elements whose complex impedances are such that their product is equal to the product of the complex impedances of said winding means and said balancing means wherein said balancing means comprises resistance and capacitance elements in ladder configurations.

12. A circuit arrangement for recording conditions upon a magnetic medium and deriving electric currents from previously recorded magnetic conditions on said magnetic medium, comprising a recording-reading head having winding means; means including a current source connected to said winding means for producing a field to magnetically modify a portion of said medium; a receiving circuit electrically connected to said winding means and responsive to currents induced therein by magnetized portions of said magnetic medium; an electrical network having two terminals between which said winding means is connected, impedance means simulating the inverse of the impedance of said winding means at the frequencies involved in magnetically modifying said medium and in producing signals from modification on said magnetic medium, two terminals between which said impedance means is connected, two terminals between which said current source is connected, and two terminals between which said receiving circuit is connected, whereby differences of potential varying at said frequencies applied to one pair of said pairs of terminals do not appear with significant magnitudes across another pair.

13. A magnetic storage system comprising a continuously moving surface of magnetic material, a recording-reading head having winding means, writing means to magnetically modify a portion of said magnetic surface, reading means responsive to currents induced in said winding means by said magnetic surface, and an electrical network connected to form with said winding means a substantially balanced impedance bridge, one arm of said bridge comprising said winding means, the opposite arm of said bridge comprising an impedance means simulating the inverse of the impedance of said winding means at the essential frequencies, said writing means connected to one set of conjugate diagonal terminals and said reading means connected to the other set of conjugate diagonal terminals of said bridge.

14. A device in accordance with claim 13 wherein transformers are employed to couple said reading means and said writing means to said bridge.

15. A reading-writing circuit for a transducer comprising in combination with the coil of a transducer, three impedances connected therewith to form a substantially balanced electrical bridge, a writing circuit connected to two of the conjugate terminals of said bridge and adapted to drive writing currents through said coil, and a reading circuit connected to the other two conjugate terminals of said bridge and responsive to reading voltages induced in said coil, whereby said writing currents are prevented by said bridge from appearing with significant magnitude across said two conjugate terminals connected to said reading circuit.

16. A signal storage device comprising a magnetic sheet movable in a reentrant path, a recording-reading head having a winding means, recording means for magnetically modifying a portion of the surface of said magnetic sheet by delivering recording currents through said winding means, reading means responsive to electrical impulses induced in said winding means by said magnetic surface, an electrical network connected to form with said winding means a substantially balanced impedance bridge, said network including a balancing means disposed as an arm of said bridge opposite said winding means to simulate the inverse of the impedance of said winding means at the essential frequencies, two other arms of said bridge comprising impedance elements having complex impedances the product of which is equal to the product of the complex impedance of said winding means and said balancing means, wherein said recording means is continuously connected to one set of conjugate diagonal terminals of said bridge and said reading means is continuously connected to the other set of conjugate diagonal terminals of said bridge and wherein said recording currents are prevented by said balanced bridge from appearing with significant magnitude across said set of conjugate terminals connected to said reading means.

References Cited in the file of this patent

UNITED STATES PATENTS

| | | |
|---|---|---|
| 1,553,390 | Nyman | Sept. 15, 1925 |
| 2,539,876 | Von Behren | Jan. 30, 1951 |
| 2,638,578 | Piety | May 12, 1953 |